3,125,548
POLYETHYLENE BLEND

Edwin Lee Anderson, Orange, Tex., assignor to E. I. du Pont de Nemours and Company, Wilmington, Del., a corporation of Delaware
No Drawing. Filed May 19, 1961, Ser. No. 111,140
6 Claims. (Cl. 260—45.5)

This invention relates to a polyethylene blend and more particularly to a blend of three different types of polyethylene, which results in a superior extrusion coating resin.

In accordance with the present invention, a superior polyethylene extrusion coating resin is obtained by a process which comprises blending 20 to 45 weight percent of a polyethylene having a density of less than 0.920 g./cc. and preferably a melt index of 1.5 to 5 g./10 min., 30 to 60 weight percent of a polyethylene having a density of 0.924 to 0.933 g./cc., and preferably a melt index of 5 to 15 g./10 min. and at least 10 weight percent of a polyethylene having a density above 0.945 g./cc. and preferably a melt index of 5 to 35 g./10 min. to form a blend having a density of 0.925 to 0.935 g./cc. and preferably a melt index of 3.5 to 15 g./10 min.

It was discovered that this blend of a low density, an intermediate density and a high density polyethylene resin, where the blend itself has an intermediate density, possesses a combination of processing and coated film properties which is not obtained by direct synthesis of a resin having the same density as the blend nor is obtained by the blending of a high density polyethylene resin, e.g., a resin having a density above 0.945 g./cc., with a low density resin, e.g., a resin having a density below 0.920 g./cc., in such proportions as to result in the same density as the three component blend of this invention.

The components employed in the blend of the present invention are all high molecular weight, solid polyethylenes having melting points of at least 110° C. and are commercially available. Thus, "Alathon" 15 is a suitable low density polyethylene, "Alathon" 37 a suitable intermediate density resin and "Alathon" 7050 a suitable high density polyethylene resin. The melt indices of the resin components are not as critical as either the densities or the proportions of the resin components and are chosen in general to allow an optimum rate of production on equipment employed commercially in the extrusion coating of polyethylene. Resins having the properties of the blend may therefore be prepared from resin components which do not necessarily have the melt indices within the ranges set forth, although these blends do not have the processibility on currently available commercial coating machines.

The blending step may be carried out by any of the techniques known in the art. Thus the resin components, in the form of a powder or granules, may be preliminarily dry-blended or tumbled and subsequently melt blended on heated calender rolls or in a Banbury mixer or directly extruded with an extruder containing a mixing section included in the extrusion screw. Other techniques of blending will be apparent to those skilled in the art.

The invention is further illustrated by the following examples. All parts are by weight unless otherwise specified. The density of the polyethylene as employed herein is measured in accordance with ASTM D–792–50 and the melt index as employed herein in accordance with ASTM D–1238–57T.

EXAMPLES I–IV

A dry-blended mixture comprising 36 parts of a polyethylene having a density of 0.917 g./cc. and a melt index of 4.0 g./10 min., 40 parts of a polyethylene having a density of 0.930 g./cc. and a melt index of 5.3 g./10 min. and 24 parts of a polyethylene having a density of 0.954 g./cc. and a melt index of 6.0 g./10 min. was extruded through an extruder wherein the extruder screw was equipped with a mixing torpedo, at a temperature of 250° C. until a uniform blend was obtained. The resulting blend (Example I) having a density of 0.930 g./cc. and a melt index of 5 g./10 min. was cube-cut and then charged to a 4½" extruder having a barrel length to diameter ratio of 21:1. The rear of the barrel was maintained at 475° F. and the front of the barrel at 625° F. A metering type screw with gradual compression through 5 turns was employed. The melt prior to entering the die passed through two 80 mesh screens and six 120 mesh screens. The die was a keyhole-shaped one piece body die, having a die orifice 24" long and 20 mils wide. The temperature of the die was maintained at 625° F. The extruder was operated at a 100 pph. production rate. The resulting film extrudate was passed through a 3" air gap into the nip formed by a pressure roll and a chill roll. Both kraft paper, 24" wide, and the film extrudate were simultaneously feed into the nip formed by the chill and pressure roll; the latter comprising an all-purpose rubber roll in contact with the kraft paper. The pressure applied was approximately 60 lbs. per linear inch of rolls. The chill roll comprised an 18" diameter mirror finish chrome plated steel roll, water-cooled, to maintain a temperature of 65° F. on the surface roll. The chill roll was operated at a linear speed of 600 f.p.m. unless otherwise indicated. The coated paper was taken off the chill roll at a point where the coating had cooled to below 120° F.

The extrusion coating was repeated using an assynthesized resin having a melt index of 3.0 g./10 min. and a density of 0.930 g./cc. (Example II), and a blend of 30 parts of a polyethylene having a density of 0.917 g./cc. and a melt index of 4.0 g./10 min. and 70 parts of a polyethylene having a density of 0.954 g./cc. and a melt index of 6.0 g./10 min. (Example III). A comparsion of the properties of these three compositions is shown in Table I, both with respect to processibility and coated product properties.

Table I

| Polymer | Example I Three-component Blend | Example II As-Synthesized | Example III Two-component Blend |
|---|---|---|---|
| Density | 0.930 g./cc. | 0.930 g./cc. | 0.930 g./cc. |
| Melt Index | 5.0 g./10 min. | 3.0 g./10 min. | 4.5 g./10 min. |
| Neck-in | ⅞ in. | 1¹¹⁄₁₆ in. | (¹) |
| Maximum Draw Rate | 1,000 f.p.m. | 900 f.p.m. | 450 f.p.m. |
| General Processibility | excellent | good | poor. |
| Heat Seal Range | broad (250–450° F.) | narrow (350–450° F.) | (¹) |
| Adhesion: | | | |
| 1 mil—14.4 lbs./ream | 100% | 85% | (¹) |
| 0.34 mil—5 lbs./ream | 95% | 55% | (¹) |
| Pin Holes | 0 | 3–4 | (¹) |
| Water Vapor transmission rate | 2.6 g./m.²/24 hrs./mil. | 2.7 g./m.²/24 hrs./mil. | (¹) |

¹ The product obtained was of such poor quality that no tests were performed.

The "neck-in" comprises the difference in inches between the die slot length and the final web width. It is, of course, desirable to reduce this neck-in to a minimum. Maximum draw rate was determined by increasing the speed of the chill roll while maintaining the rate of extrusion. The speed at which the polyethylene web starts to break is the maximum draw rate. The machine speed limit was 1000 f.p.m. The three-component blend showed no signs of any breaks at that limit. By general processibility is meant the general behavior of the melt during extrusion and coating and it is determined by such factors as edge weaving, uniformity of coating, thickness, blisters, clarity of extrudate and smoothness of coating.

Heat seal range was determined by folding a 10" wide sample lengthwise with the polyethylene surfaces in contact so that a one-inch seal across the entire surface left two-inch tabs on either side. The sample was sealed in a model 12–12ASC Sentinel heat sealer having a one-inch wide jaw heated on one side. A one-half second dwell time at a jaw pressure of 40 p.s.i. was employed. The temperature was increased from 250° F. to 450° F. in 50° F. increments. One-inch wide specimens of the samples sealed at the indicated temperatures were peeled in a tensile tester at a crosshead speed of twelve inches per min. The heat seal range was determined by the range of temperatures which gave satisfactory seals.

Adhesion was measured on the Perkins-Southwick bond tester. In this dynamic test a sample of coated paper is clamped over the 1 sq. in. orifice of a plenum chamber. Compressed air at a regulated predetermined pressure is allowed to enter the chamber at a uniform rate and exert pressure on the coated, porous side of the sample. The pressure is allowed to build up until the sample fails. The test is repeated except that the pressure is exerted on the coated surface. Adhesion is calculated in percent of the pressure of the porous surface to the pressure of the coated surface.

Pinholes were measured by applying a red dye in a mineral spirit to the coated surface and determining the number of holes per sq. ft. through which the dye leaked into the substrate. Water vapor transmission rate was determined in accordance with ASTM E–96–53–T.

As can be seen from the foregoing examples, a two-component blend of a high density and a low density polyethylene shows no improvement over a directly synthesized resin and, on the contrary, is substantially worse than the directly synthesized resin which heretofore was believed to be the optimum type of resin for extrusion coating. The three-component blend, however, shows a significant improvement over the directly synthesized resin.

Substantially similar results were obtained when a three-component blend of the following resins was substituted for the three component blend described:

(1) 25% of polyethylene having a density of 0.915 g./cc. and a melt index of 1.9 g./10 min.;
(2) 55% of a polyethylene having a density of 0.930 g./cc. and a melt index of 5.3 g./10 min.; and
(3) 20% of a polyethylene having a density of 0.954 g./cc. and a melt index of 6.0 g./10 min.

The blend of the present invention finds its greatest utility in extrusion coating applications, although other applications are not excluded. The blends of the present invention may also be modified for particular applications by the addition of stabilizers, antioxidants, pigments and dyes, light absorbers and other common additives or may be modified by any number of known after treatments to improve such properties as printability, etc.

I claim:

1. A polyethylene blend comprising 20 to 45 weight percent of a polyethylene having a density of less than 0.920 g./cc., 30 to 60 weight percent of a polyethylene resin having a density of 0.924 to 0.933 g./cc. and at least 10 weight percent of a polyethylene resin having a density above 0.945 g./cc.

2. A polyethylene blend of claim 1 wherein the blend has a density of 0.925 to 0.935 g./cc.

3. A polyethylene blend comprising 20 to 45 weight percent of a polyethylene having a density of less than 0.920 g./cc. and a melt index of 1.5 to 5 g./10 min., 30 to 60 weight percent of a polyethylene having a density of 0.924 to 0.933 g./cc. and a melt index of 5 to 15 g./10 min. and at least 10% of a polyethylene having a density above 0.945 g./cc. and a melt index of 3.0 to 35 g./10 min., said blend having a density of 0.925 to 0.935 g./cc.

4. The blend of claim 3 wherein the melt index of the blend is from 3.5 to 15 g./10 min.

5. The blend of claim 1 in film form.

6. A coating comprising the blend of claim 1 on a paper substrate.

References Cited in the file of this patent
UNITED STATES PATENTS 2,868,762    Oakes _____ Jan. 13, 1959
2,983,704    Roedel _____ May 9, 1961